Dec. 19, 1950 — M. F. KEMPER — 2,534,270
APPARATUS FOR TRANSPORTING MATERIALS
Filed Jan. 13, 1947 — 2 Sheets-Sheet 1

Maxwell F. Kemper
INVENTOR.

BY Paul A. Weilein
ATTORNEY

Dec. 19, 1950 M. F. KEMPER 2,534,270
APPARATUS FOR TRANSPORTING MATERIALS
Filed Jan. 13, 1947 2 Sheets-Sheet 2

Maxwell F. Kemper
INVENTOR.

BY Paul A. Weilein
ATTORNEY

Patented Dec. 19, 1950

2,534,270

UNITED STATES PATENT OFFICE 2,534,270

APPARATUS FOR TRANSPORTING MATERIALS

Maxwell F. Kemper, Los Angeles, Calif.

Application January 13, 1947, Serial No. 721,717

17 Claims. (Cl. 259—147)

This invention relates generally to an apparatus for handling bulk material, and more particularly an apparatus for batch handling of a slurry of cementitious material or other mixtures of liquid and solid constituents wherein the solid constituents are of greater specific gravity than the liquid.

During the temporary storage or transportation of material of the above character, the solid constituents tend to gravitate toward and concentrate in the lower portion of the vessel or container in which a batch of the material is stored or transported. The type of vessel generally employed for this purpose is usually provided with an outlet in the lower portion thereof, through which the material flows by gravity into a conduit through which it is discharged. Under these circumstances, the concentration of the solid constituents of the mixture or slurry in the lower portion of the vessel and in the discharge conduit creates a serious obstacle to the discharge of the material in a uniformly mixed condition, and often clogs the discharge conduit and prevents discharge of the material from the vessel.

It is a principal object of this invention to provide an apparatus for handling material of the character set forth above wherein the solid constituents are uniformly dispersed through the mixture prior to its discharge from a container.

It is another object of the invention to provide an apparatus for batch handling of a slurry wherein the slurry is agitated prior to its discharge from a container, by the introduction of gaseous fluid into the container, to disperse the solid constituents of the slurry.

The present invention has particular application to the handling of concrete or other cementitious material during tunnel lining operations. In accordance with present practice, the mixed concrete is transported to the site of the tunnel lining operation in containers mounted on small cars coupled together to form a train. Each car is provided with a discharge conduit below and communicating with the container, into which compressed air is admitted for ejecting the concrete from the container through a suitable conduit to the point of use. Apparatus of this general type is disclosed in my prior Patent No. 2,313,826. A considerable time interval may elapse between filling the container and the discharge of the concrete therefrom, during which interval the solid constituents of the concrete slurry tend to gravitate toward and concentrate in the lower portion of the container and in the discharge conduit. This is also aggravated by vibration of the concrete during transit.

It is a more specific object of this invention to provide an apparatus for the batch handling of concrete slurry and the like in containers, characterized by the provision of means for agitating the slurry prior to its discharge from the container by the introduction of gaseous fluid into the container at a point in the region of its discharge outlet, whereby solid constituents concentrating in the region of the discharge outlet are dispersed through the batch of slurry.

It is a further object of the invention to provide a container for concrete slurry or the like having a fluid-tight closure for the discharge outlet, and further provided with means for introducing gaseous fluid into a batch of slurry in the container at a point adjacent the discharge outlet.

A still further object of the invention is to provide closure mechanism for conduits and the like, and particularly for a discharge conduit associated with a container for materials such as concrete and the like.

A still further object is to provide, in association with a container for a cementitious slurry and means for discharging a batch of slurry from the container, means for introducing a mixture of gas and liquid into the slurry prior to its discharge for the purpose of re-mixing the slurry and increasing its fluidity.

A further object of the invention is to provide a portable container for concrete and the like which is mounted on a vehicle base having means for coupling the vehicle to another vehicle, the container having an outlet adjacent the coupling means, and novel closure means for the outlet so constructed and arranged that it may be disposed in sealing relation with the outlet while the vehicle is coupled to another vehicle.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

The present invention is especially adaptable to use in conjunction with apparatus such as that illustrated and described in my prior U. S. Patent No. 2,313,826. The apparatus shown therein comprises in general a vehicle having flanged wheels adapted to be propelled over a narrow gauge tunnel track. A pressure vessel for containing concrete, usually referred to as a concrete placer, is mounted on the vehicle frame. The bottom of the vessel is shaped into the form of a hopper feeding into a horizontal concrete-conveying conduit also forming a part of the placer. An air pipe is connected to the rear end of the conduit adjacent one edge of the hopper so that a stream of air may be forced into the conduit, driving the concrete in the conduit out of the placer and into a second conduit which conveys it into the tunnel lining form. As the bottom layers of concrete are forced out of the placer, the top layers drop down in the hopper into the conduit and are in turn forced from the placer.

It often occurs in long tunnel operation that by the time the placer reaches the operating region within the tunnel the concrete is so firmly packed in the bottom of the hopper that it cannot be ejected by the compressed air. The chief blocking source in such instances is often a plug of concrete which is formed in the concrete conveying conduit of the placer, between the ejection end thereof and the bottom of the hopper.

In accordance with the present invention, the placer is provided with means for introducing air into the bottom of the hopper during transit of the placer, thus allowing the concrete to be agitated from time to time to prevent its setting in the bottom of the hopper and in the conduit. More specifically, means are provided for introducing compressed air into the ejection end of the concrete conduit, thereby preventing formation of the blocking plug mentioned above. In the embodiment illustrated herein, this means assumes the form of a cap which may be placed over the ejection end of the conduit, the cap having an inlet opening therein through which compressed air may be forced into the conduit. A hose is connected to the inlet opening, the other end of the hose being connected to the air pipe on the placer, so that a flow of compressed air may be maintained into the ejection end of the conduit through the cap. From the cap, the air flows through the ejection end of the conduit and into the hopper, where it maintains the concrete in a state of agitation, thereby preventing the formation of a plug of concrete in the ejection end of the conduit, as well as preventing the setting of the concrete in the bottom of the hopper.

The air pipe on the placer is also provided with means whereby water may be introduced into the pipe so that, simultaneously with the admission of agitating air into the placer, the consistency of the mixture, if desired, may be thinned to further prevent premature setting of the concrete and to facilitate pneumatic conveyance thereof from the placer to the point of use.

Referring now to the drawings.

Figure 1:
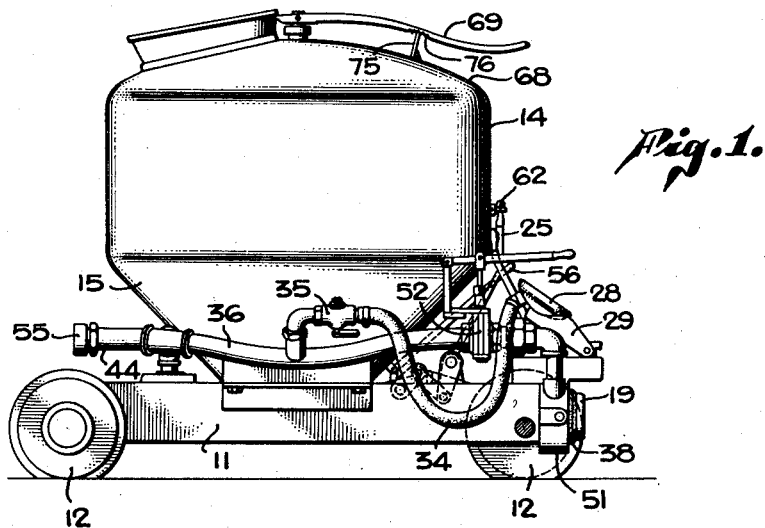
Figure 1 is a side elevation of a placer constructed in accordance with the principles of this invention, with the conduit-closing cap in retracted position.

Referring to Figure 1, the placer is shown having a truck body 11 mounted on flanged wheels 12 and propellable along the track 13. Mounted on the frame 11 is a pressure vessel 14, the lower end of which is formed into a hopper 15. The mouth 16 of the hopper 15 (Figure 4) opens downwardly into a horizontal, centrally disposed, concrete-conveying conduit 17. The rear end of the conduit 17 is closed beyond the mouth 16 by a valve 18, constructed generally in accordance with my prior U. S. Patent No. 2,344,703. The outer end of the conduit 17 extends to the forward end of the placer and is open to form an ejection mouth 19. Between the mouth 19 of conduit 17 and the mouth 16 of the hopper 15 is interposed a flapper valve 21, which may be nested out of the way in a flat recess 22 formed in the upper wall of the conduit 17. The valve 21 is pivotally mounted in conduit 17 on a shaft 23 extending outside the conduit and connected by means of links 24 to an operating lever 25 pivoted at 26 in a pair of upstanding bearing members 27. The valve 21 is used during normal transit of the placer to prevent the concrete from flowing out of the mouth 19. When it is desired to eject the concrete from the mouth 19 into another conduit, the valve 21 is maintained open by means of a pendant latch 30 pivoted to the lever 25; and the valve 18 is manipulated to control the admission of compressed air into the conduit 17 to eject the concrete from the hopper 15 out of the mouth 19. The foregoing described mode of operation is in general similar to that described in my above noted Patent No. 2,313,826.

Figure 6:
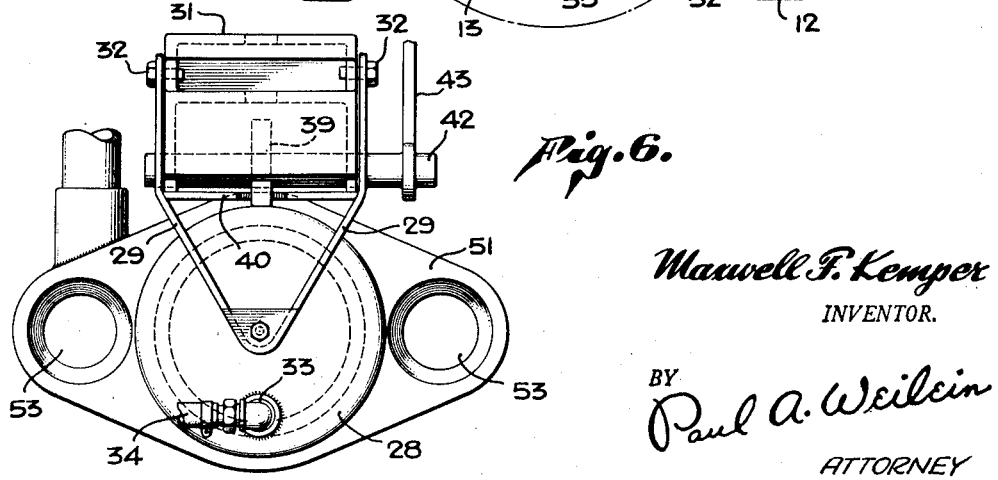
Figure 6 is an enlarged fragmentary end view of the conduit-closing cap.

In accordance with the present invention, auxiliary closing means are provided in the form of a cap 28 pivotable into position over the mouth 19 by means of a pair of mounting arms 29 which span the placer coupling block 31, and are hinged thereto by means of bolts 32 (Figure 6).

The cap 28 is provided with an air inlet 33 to which is connected a flexible air hose 34. The other end of the air hose 34 is connected, through a valve 35, to the principal air pipe 36 of the placer. In this manner, air may be introduced into the bottom of the hopper 15, not only through the air valve 18, but also through the ejection mouth 19 of conduit 17, whereby converging streams of air are forced into the conduit 17, upwardly through the hopper 15, and out the filling opening 37 in the upper wall of the pressure vessel 14. This action prevents the formation of a plug of concrete in the conduit 17, particularly near the ejection mouth 19, and also serves to agitate the concrete throughout the body of the placer. By providing the air inlet 33 in the cap 28 instead of in the wall of the conduit 17 adjacent the ejection mouth 19, the inlet and its supply conduit 34 are wholly removed from the stream of concrete during its ejection from the container, thus avoiding possible clogging thereof by concrete.

Figure 3:
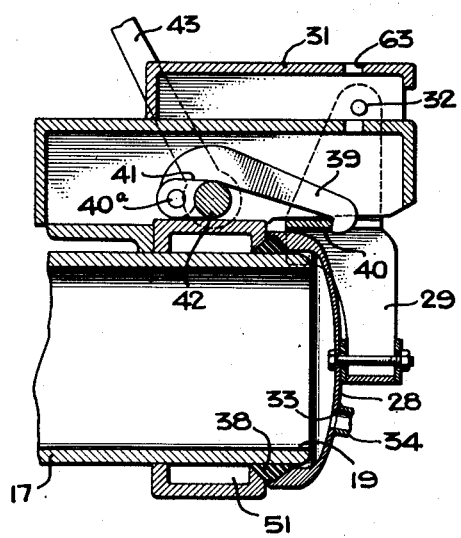
Figure 3 is an enlarged fragmentary section showing the cap locked over the ejection end of the concrete conveying conduit.
Figure 4:
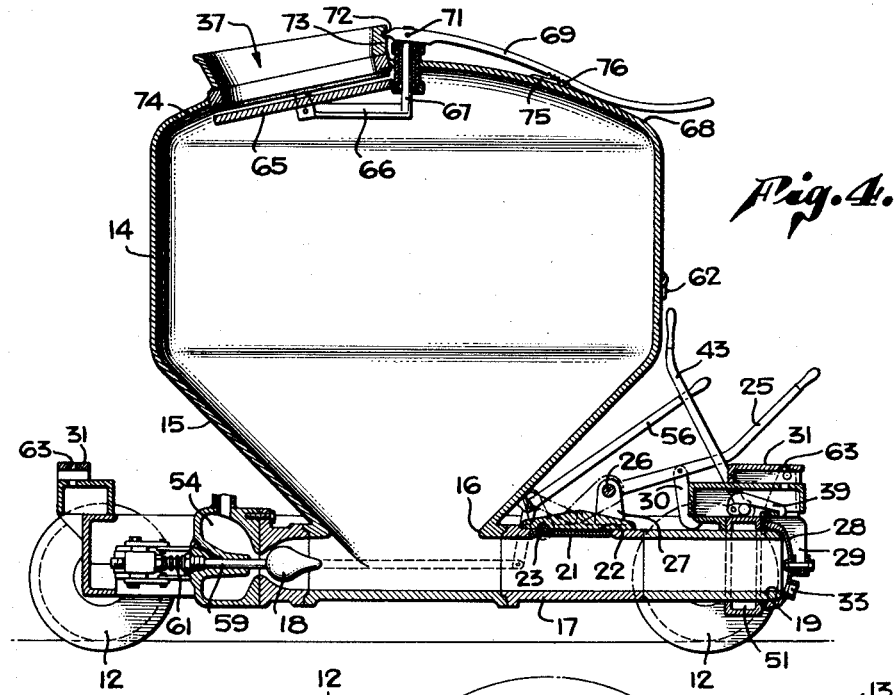
Figure 4 is a vertical section of the complete placer with the conduit closing cap placed to seal the end of the conduit.

As best seen in Figure 3, the cap 28 is maintained seated in fluid-tight engagement with an annular gasket 38 by means of a latch 39 which drops over a horizontal cross-piece 40 secured between the hinged arms 29. The rear end of the latch 39 is pivotally connected at 40a to a toggle link 41, the other end of which is connected to a shaft 42 to which is secured an operating lever 43. As best seen in Figure 4, outward pivoting of the lever 43 causes the latch 39 to drop over the edge of the cross member 40 so that return of the lever 43 to its inward position, shown in Figure 4, causes the latch to pull firmly against the cross member 40, thereby pressing the cap 28 against the gasket 38 and sealing the ejection mouth 19 of conduit 17. It will be observed that in the closed position of the cap, a line drawn through the pivot 40a and latching shoulder on the latch 39 passes below the axis of the shaft 42, thereby providing a selflocking toggle arrangement maintaining the latch in this position. The seal thus formed not only prevents emergence of concrete from the mouth 19, but is in addition air-tight, so that compressed air admitted through the aperture 33 is forced to flow into the hopper 15.

Figure 5:
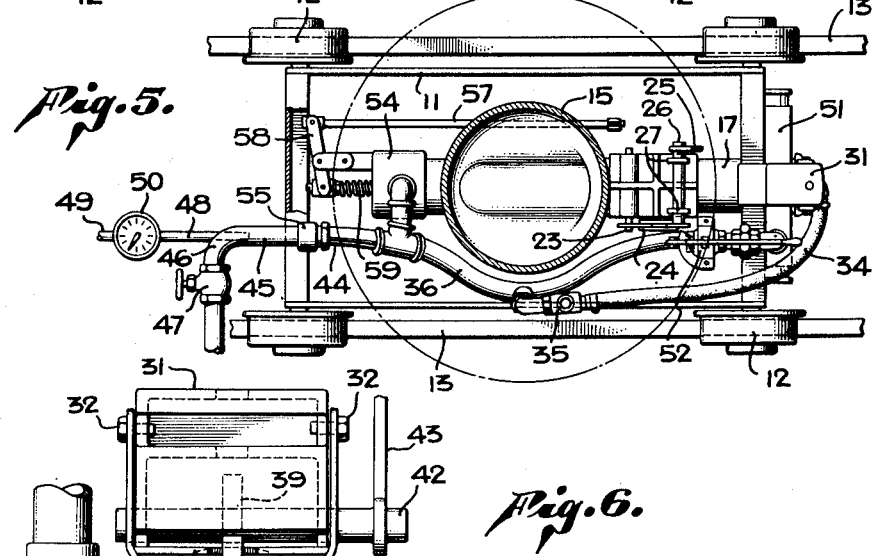
Figure 5 is a plan view similar to Figure 2, showing the cap in closed position, and illustrating additionally the means for introducing water into the placer.

At times it is desirable to add water to the concrete mix shortly prior to the discharge of the concrete from the placer. Such added water may be more effectively mixed with the concrete if introduced at the bottom of the container along with the compressed air. Accordingly, means are provided for introducing a measured amount of water into the agitating air before it is forced into the ends of the conduit 17 and into the hopper 15. As shown in Figure 5, to the rear end 44 of the air pipe 36 is secured an air feed line 45 having a bend 46 therein followed by a control valve 47. A small water pipe 48 is introduced into pipe 45 at the bend 46, the other end 49 of the pipe 48 being connected to a water supply. Such a water supply is normally used during the usual tunnel lining operation, inasmuch as the laying of water pipes is generally required for cooling the excavating equipment. A water meter 50 is inserted in the pipe 48 so that a controlled predetermined amount of water may be introduced into the concrete mass.

The coupling members on the forward end of the placer will now be described. As shown in Figure 1, the ejection end 19 of the conduit 17 is centrally disposed at the forward end of the placer. Positioned around the end 19 is a transverse air chamber 51 (Figure 4) communicating with the air pipe 36 through a valve 52. The chamber 51 has a pair of apertures 53 (Figure 6) on each side of the end wall disposed symmetrically with respect to the concrete outlet 19 around which the chamber 51 is disposed.

Figure 2:
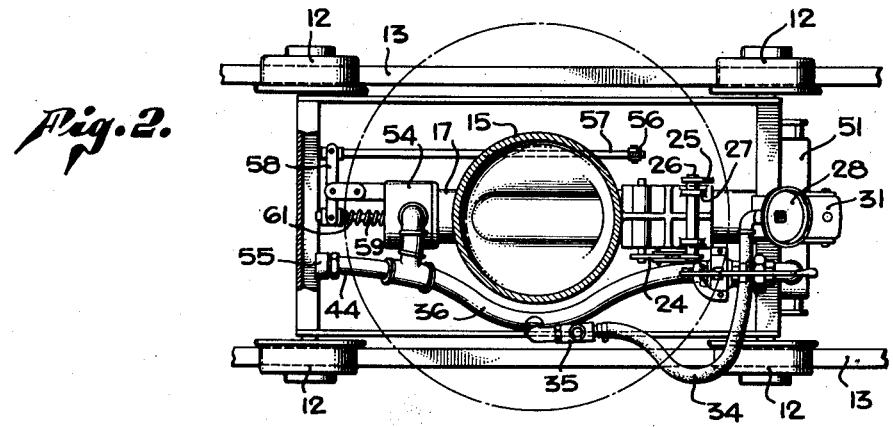
Figure 2 is a plan view of the placer of Figure 1 with the upper portion of the concrete-containing pressure vessel cut away to show the conduits therebelow.

In use, after the forward end of the placer, including the apertures 19 and 53, has been mated with a suitable air delivering and concrete receiving assembly, air is permitted to flow from the aforementioned assembly into the chamber 51 through the apertures 53. From the chamber 51 the air flows into the pipe 36 and thence into the intake chamber 54 of the valve 18. To prevent escape of air, the rear end of pipe 36 is normally provided with a sealing cap 55, as shown in Figure 2. The concrete receiving conduit of the tunnel assembly (not shown) having been mated with the ejection end 19 of the placer conduit 17, the apparatus is ready for the injection of air into the conduit 17 through the valve 18, which forces concrete from the bottom end of the hopper 15 out of the placer through the conduit 17. As seen in Figures 2 and 4, the valve 18 is actuated through a hand lever 56 which controls a reciprocable rod 57 to pivot the link 58 connected to the valve stem 59. The valve 18 is maintained normally closed by a spring 61.

A typical use of the agitating mechanism of the placer will now be described. It will be assumed that following the hauling of the placer from the mouth of the tunnel to the operating region, or to a switch point at which it is forced to wait, the concrete in the placer is in danger of becoming set, thus warranting remixing by air agitation. In this event, prior to the ejection of the concrete in the manner described in the preceding paragraph, the agitation will be effected. The cap 28 is first lowered from the position shown in Figures 1 and 2 to that shown in Figures 3, 4 and 5.

The lever 43 is moved outwardly, allowing the latch 39 to engage the forward edge of the cross member 40. The lever 43 is then returned to its inward position, causing the latch 39 to draw the cap 28 firmly over the ejection end 19 of the conduit 17. The cap 55 is then removed from the rear end of the air line 36, and the air supply pipe 46 is applied thereto. The valve 52 is closed to prevent escape of air through the apertures 53 of chamber 51. The valve 35 is opened to allow air to pass through the hose 34 and the aperture 33 in the cap 28 and into the ejection end of the conduit 17. The flapper valve 21 is then opened by releasing the handle 25 from the ring latch 62 (Figure 1) and lowering the handle to the position shown in Figure 4, thereby raising the valve 21 into its recess 22. While the valve 18 is held open by holding down the lever 56, the valve 47 in the air pipe 46 is opened as required to permit air to flow simultaneously into each end of the conduit 17, through the valve 18 and the aperture 33 respectively. In this manner concrete in the full length of the conduit 17 is agitated, the agitating air passing upwardly into the hopper 15 and escaping to the atmosphere through the filling opening 37.

If required, a predetermined amount of water may be added to the mixture by means of the water pipe 48 (Figure 5).

An important feature of the present invention lies in the ability to admit agitating air when the placer is in transit in a train of similar placers. For this purpose, a special car is inserted in the train, bearing an auxiliary air tank containing compressed air, by means of which air may be applied through the pipe 46 to the placer during transit of the train. In this connection it will be noted that the car couplers 31, which include coupling pin holes 63, are outwardly offset from the car frame 11 a sufficient distance to permit coupling of adjacent cars even though the cap 28 is in closed position over the ejection end 19 of the conduit 17.

If the transit time between loading and unloading of the placer is sufficiently short that interim agitation is not required, the cap 28 may be left in its retracted position, as shown in Figures 1 and 2, and the flapper valve 21 closed to prevent the escape of concrete during transit. In this event, the valve 35 is kept closed, the cap 55 remains on the end of the pipe 36, and the valve 52 remains open.

As mentioned hereinbefore, during the agitation process, the filling opening 37 is opened slightly to allow escape of air while preventing expulsion of concrete. This is accomplished by the closure mechanism illustrated in Figure 4, including the closure plate 65, loosely mounted on the end of a horizontal arm 66, which is integrally formed on the lower end of a vertical shaft 67 extending through the top 68 of the vessel 14. A generally horizontal handle 69 is pivotally mounted at 71 on the upper end of the shaft 67, so that by swinging the handle 69 about the axis of the shaft 67, the latter may be rotated to swing the plate 65 into and out of registry with the opening 37. With the plate 65 positioned directly under the opening 37, the shaft 67 may be moved axially upwardly by fulcruming the handle 69 in a groove 72 formed in a portion 73 of the flange surrounding the opening 37. The plate 65 is thus pressed into firm sealing engagement with an annular gasket 74 seated in a recess in the underside of the rim of the opening 37. The end of the handle 69 is maintained in raised position by elevating a locking member 75 into engagement with one of several notches 76 formed on the underside of the handle 69.

Thus, by releasing the locking member 75 and lowering, but not swinging, the handle 69, the closure plate 65 may be lowered slightly away from the gasket 74 of the opening 37, thereby allowing air to escape through the opening while still preventing expulsion of the concrete due to the agitation within. The closure means above described forms the subject matter of my co-pending application, Serial Number 721,718, filed January 13, 1947.

From the above description it will be seen that there has been disclosed herein a method and apparatus for remixing concrete in a placer by the introduction of agitating air into the ejection conduit leading from the placer and thence into the main body of concrete, thereby preventing the formation of a plug of concrete in the ejection conduit and also maintaining the main body of concrete in a state of agitation. It will be further seen that the agitating method described may, if desired, be employed during transit of the placer from its loading stand to the point of discharge, thus insuring that the concrete will have no opportunity to set during transit.

I claim:

1. Materials handling apparatus comprising a materials container having a discharge opening therein, a discharge conduit communicating with said opening through which materials are discharged from said container, closure means for the discharge end of said conduit, optionally operable to extend transversely across said conduit for closing the conduit or to be clear of said conduit, and fluid inlet means carried by said closure means for the admission of agitating fluid into said conduit and through a body of materials in said container when said closure means is in closed position.

2. Materials handling apparatus comprising a materials container having a vent in its upper portion and a discharge opening in its lower portion, a discharge conduit communicating with said opening through which materials are discharged from said container, closure means for the discharge end of said conduit, optionally operable between a position closing said discharge end and a position outside said conduit and fluid inlet means carried by said closure means to admit agitating fluid into said conduit for circulation through a body of materials in said conduit and container and outwardly through said vent, when said closure means is in closed position.

3. Apparatus for temporary storage of a fluent mixture of liquid and solid constituents, comprising a container having a vent in its upper portion and a discharge opening in its lower portion, a discharge conduit in open communication with said opening through which the mixture is discharged and into which the solid constituents thereof tend to gravitate, and means for agitating said mixture to disperse the solid constituents thereof uniformly therethrough, said means comprising a closure for the discharge end of said conduit and inlet forming means carried by said closure for the admission of gaseous fluid into said conduit for circulation through said mixture and outwardly through said vent.

4. Materials handling apparatus comprising a materials container having a discharge opening, a conduit communicating with said opening, an inlet at one end of said conduit for admitting gaseous fluid for effecting pneumatic discharge of materials from said container through the other end of said conduit, means for closing the discharge end of said conduit, and means operable to communicate with said conduit when said discharge end is closed for admitting gaseous fluid into said conduit at the discharge end thereof for agitating the materials in said conduit and container.

5. Materials handling apparatus comprising a materials container having a discharge opening in its lower portion, a conduit below and communicating with said opening and into which materials gravitate from said container, an inlet in said conduit at one side of said opening for admitting gaseous fluid for effecting pneumatic conveyance of materials from said container through the opposite end of said conduit, closure means for the discharge end of said conduit, means for rendering said closure means ineffective during discharge of materials and for moving said closure means into sealing engagement with said discharge end, and means for admitting gaseous fluid to said conduit at the discharge end thereof when said discharge end is closed, for agitating said materials.

6. Materials handling apparatus comprising a materials container having a discharge opening in its lower portion, a conduit communicating with said opening through which materials are discharged from said container, a closure member for the discharge end of said conduit, and a fluid inlet in said closure member for admitting agitating fluid to said conduit and container.

7. Materials handling apparatus comprising a materials container having a materials inlet opening in the upper portion thereof and a discharge opening in the lower portion thereof, a conduit communicating with said opening, means for admitting fluid under pressure to said conduit to discharge materials from said container through the discharge end of said conduit, closure means for sealing said materials inlet opening against escape of said pressure fluid, means for closing the discharge end of said conduit, and inlet means for admitting fluid to said conduit at the discharge end thereof, said materials inlet closure means being adjustable to partially opened position to permit circulation of fluid from said last-named inlet means through the materials in said conduit and container and outwardly through said materials inlet.

8. Materials handling apparatus comprising a materials container having a discharge opening, a discharge conduit communicating with said opening through which materials are discharged from said container, the discharge end of said conduit being adapted to be coupled to a second conduit, a closure member mounted adjacent said discharge end for movement between an inactive position permitting coupling of said conduits and an active position sealing said discharge end, and means operative when said closure member is in active position to admit fluid to said discharge conduit at the discharge end thereof.

9. Materials handling apparatus comprising a materials container having a discharge opening, a conduit communicating with said opening through which materials are discharged from said container, a closure member pivotally mounted adjacent the discharge end of said conduit for movement between an open position clear of said conduit and a closed position sealing said discharge end, and a fluid inlet in said closure member for admitting fluid to said conduit when said closure member is in closed position.

10. Materials handling apparatus comprising a materials container having a discharge opening, a conduit communicating with said opening, a fluid inlet adjacent one end of said conduit for admission of fluid for ejecting materials from said container and conduit through the other end thereof, closure means for the discharge end of said conduit, and fluid inlet means carried by said closure means, said fluid inlets being connectable to a common source of fluid for simultaneously admitting fluid to said conduit at both ends thereof.

11. Apparatus for transporting and discharging materials comprising a vehicle base, a materials container on said base having an outlet in the lower portion thereof, a conduit communicating with said outlet through which materials are discharged from said container, a fluid inlet in said conduit for admitting fluid thereto for ejecting materials from said container through the discharge end of said conduit, and means for agitating said materials prior to ejection thereof comprising closure means for the discharge end of said conduit and inlet forming means carried by said closure means for agitating fluid adjacent said discharge end.

12. Apparatus for transporting and discharging a fluent mixture of liquid and solid constituents, the solid constituents of which tend to gravitate downwardly during transport, said apparatus comprising: a vehicle base; a container for said mixture mounted on said base and having an inlet in its upper portion and an outlet in its lower portion; closure means for said inlet; a conduit below and communicating with said outlet; a fluid inlet adjacent one end of said conduit for admitting gaseous fluid thereto to effect pneumatic conveyance of said mixture from said conduit through the other end thereof; and means for agitating said mixture prior to discharge thereof to disperse the solid constituents uniformly therethrough, said means comprising closure means for the discharge end of said conduit, and a fluid inlet for agitating fluid adjacent said discharge end; said container inlet closure means being adjustable to partially open position to permit circulation of said agitating fluid through said mixture from said discharge end to the upper portion of said container and outwardly through said container inlet.

13. Materials handling apparatus comprising a materials container having an outlet in its lower portion, a discharge conduit communicating with said outlet, a valve-controlled inlet adjacent one end of said conduit for admitting fluid thereto to eject materials from said container through the other end of said conduit, closure means mounted adjacent the discharge end of said conduit for movement between an open position permitting ejection of materials from said conduit and a closed position sealing said discharge end, a fluid inlet in said closure means, conduit means connecting each of said inlets with a source of fluid under pressure, and valve means controlling the admission of fluid to said conduit through said last-named inlet when said closure means is in closed position for agitating materials in said container.

14. Materials handling apparatus comprising a vehicle, a materials container mounted thereon and having an outlet in its lower portion, a conduit extending longitudinally of said vehicle beneath said container and communicating with said outlet, coupling means at one end of said vehicle for coupling said vehicle to another vehicle, said coupling means and the discharge end of said conduit being disposed centrally of said vehicle in superimposed relation, a closure member for the discharge end of said conduit, and means pivotally mounting said closure member on said coupling means for vertical swinging movement between a closed position in sealing engagement with said discharge end and an inactive position on the side of said coupling means opposite said conduit, said closure member and mounting means being constructed and arranged to permit said closure member to be disposed in sealing relation with said discharge end while said vehicle is coupled by said coupling means to another vehicle.

15. The combination with a vehicle frame having a coupling member at one end thereof, of a conduit on said frame terminating adjacent said coupling member and vertically aligned therewith, closure means for the end of said conduit comprising a closure member, and mounting means for said closure member comprising spaced arms fixed to said closure member and journaled on opposite sides of said coupling member for pivotally mounting said closure member on said coupling member for vertical swinging movement between active and inactive positions.

16. Materials handling apparatus comprising a materials container having an outlet, a conduit having a fluid inlet adjacent one end and a valve adjacent the other end and a materials inlet intermediate said inlet and valve and communicating with said container outlet, valve means for controlling admission of fluid through said inlet to eject materials from said container through said other end of said conduit when said valve is open, a closure member movable into sealing relation to said other end of said conduit, and a fluid inlet in said closure member for admitting fluid to said conduit for agitating said materials prior to discharge thereof.

17. Materials handling apparatus comprising a materials container having an outlet, a conduit communicating with said outlet and having a fluid inlet adjacent one end thereof, closure means adapted to selectively open or close the other end of said conduit, a second fluid inlet into said conduit adjacent said other end, conduit means adapted to connect said inlets to a source of gaseous fluid, valve means associated with said first inlet for admitting gaseous fluid to said conduit to effect pneumatic discharge of materials from said container through said other end of said conduit when said closure means is open, valve means associated with said second fluid inlet for admitting gaseous fluid to said conduit when said closure means is closed to agitate said materials, and means for introducing liquid into said conduit means to mix with the gaseous fluid admitted to said conduit.

MAXWELL F. KEMPER.

REFERENCES CITED

The following references are of record in the file of this patent:

UNITED STATES PATENTS

| Number | Name | Date |
| --- | --- | --- |
| 873,345 | Canniff | Dec. 10, 1907 |
| 1,309,671 | Weaver | July 15, 1919 |
| 1,532,947 | Ransome | Apr. 7, 1925 |
| 1,782,095 | Jensen | Nov. 18, 1930 |
| 2,027,697 | Nielsen | Jan. 14, 1936 |
| 2,191,096 | McCurdy | Feb. 20, 1940 |
| 2,313,826 | Kemper | Mar. 16, 1943 |
| 2,344,703 | Kemper | Mar. 21, 1944 |